United States Patent
Kim et al.

(10) Patent No.: US 10,643,316 B2
(45) Date of Patent: May 5, 2020

(54) IMAGE PROCESSING APPARATUS, METHOD FOR PROCESSING IMAGE AND COMPUTER-READABLE RECORDING MEDIUM

(71) Applicant: Samsung Electronics Co., Ltd., Suwon-si, Gyeonggi-do (KR)

(72) Inventors: Young-geol Kim, Seoul (KR); Jae-sung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/149,579

(22) Filed: Oct. 2, 2018

(65) Prior Publication Data

US 2019/0130543 A1 May 2, 2019

(30) Foreign Application Priority Data

Oct. 31, 2017 (KR) .................. 10-2017-0143942

(51) Int. Cl.
*G06T 5/00* (2006.01)
*H04N 5/235* (2006.01)
*H04N 9/04* (2006.01)

(52) U.S. Cl.
CPC .......... *G06T 5/008* (2013.01); *H04N 5/2355* (2013.01); *H04N 9/045* (2013.01); *G06T 2207/10024* (2013.01); *G06T 2207/20208* (2013.01)

(58) Field of Classification Search
CPC .......... G06T 5/008; G06T 2207/10024; G06T 2207/20208; H04N 9/045; H04N 5/2355
See application file for complete search history.

(56) References Cited

U.S. PATENT DOCUMENTS

| 8,014,445 B2 | 9/2011 | Segall et al. |
| 8,090,199 B2 | 1/2012 | Spampinato et al. |
| 8,989,484 B2 | 3/2015 | Moon et al. |
| 9,271,011 B2 | 2/2016 | Jia et al. |

(Continued)

FOREIGN PATENT DOCUMENTS

| JP | 2010-213360 A | 9/2010 |
| JP | 5843599 B2 | 1/2016 |

(Continued)

OTHER PUBLICATIONS

International Search Report & Written Opinion dated Feb. 1, 2019, issued in a counterpart an International application No. PCT/KR2018/011772.

(Continued)

*Primary Examiner* — Phuoc Tran
(74) *Attorney, Agent, or Firm* — Jefferson IP Law, LLP (57) ABSTRACT

An image processing apparatus is provided. The image processing apparatus according to an exemplary embodiment includes a memory, and a processor configured to obtain a High Dynamic Range (HDR) image by using a plurality of images having different brightness stored in the memory, and correct chromaticity for each pixel group including at least one pixel with respect to the obtained HDR image, wherein the processor is configured to identify an image to be used for chromaticity correction among the plurality of images for each pixel group and correct the chromaticity for each pixel group by using the identified image.

20 Claims, 7 Drawing Sheets

(56) References Cited

U.S. PATENT DOCUMENTS

| | | | |
|---|---|---|---|
| 9,626,760 B2 | 4/2017 | Narahari et al. | |
| 2009/0033755 A1* | 2/2009 | Friedhoff | G06T 5/007 348/222.1 |
| 2013/0147896 A1 | 6/2013 | Cook et al. | |
| 2014/0307960 A1 | 10/2014 | Sharma et al. | |
| 2017/0104976 A1 | 4/2017 | Bishop | |

FOREIGN PATENT DOCUMENTS

| | | |
|---|---|---|
| JP | 2016-208118 A | 12/2016 |
| KR | 10-1468433 B1 | 12/2014 |

OTHER PUBLICATIONS

Choi et al.; A Color Correction Method for High-Dynamic-Range Images Based on Human Visual Perception; Journal of Korea Multimedia Society; vol. 18, No. 9; Sep. 2015.

Hasinoff et al.; Burst photography for high dynamic range and low-light imaging on mobile cameras; ACM Trans. Graph.; vol. 35, No. 6, Article 192; Nov. 2016.

\* cited by examiner

IMAGE PROCESSING APPARATUS, METHOD FOR PROCESSING IMAGE AND COMPUTER-READABLE RECORDING MEDIUM

CROSS-REFERENCE TO RELATED APPLICATIONS

This application claims priority from Korean Patent Application No. 10-2017-0143942, filed on Oct. 31, 2017, in the Korean Intellectual Property Office, the disclosure of which is incorporated herein by reference in its entirety.

BACKGROUND

1. Field of the Invention

Devices and methods consistent with what is disclosed herein relate to an image processing apparatus, a method for image processing and a computer-readable recording medium, and more particularly, to an image processing apparatus for generating a HDR image of high quality, a method for image processing and a computer-readable medium.

2. Description of the Related Art

With the development of image technology, a technique has been developed for obtaining a High Dynamic Range (HDR) image with a wider contrast range beyond the limitation of contrast that can be produced by a digital camera.

Recently, as the digital camera market has shifted from Digital Still Camera (DSC) to a smartphone, and the dynamic range of a digital camera has been narrowed due to physical limitations of a lens and an image sensor, and a stronger HDR image technique has been in high demand.

In addition, when synthesizing images of different brightness for generating a HDR image, incompatibility occurs at the boundary where the brightness rapidly changes. Blending of boundary areas is done in order to solve the problem, but when the images are synthesized by using the images with a large difference in brightness, there arises a problem that color spreading occurs in the boundary area where the brightness difference is large.

Accordingly, there is a need for a technique for minimizing undesirable color blurring in HDR image synthesis.

SUMMARY

An aspect of the exemplary embodiments relates to providing an image processing apparatus for correcting color blurring of an HDR image, an image processing method, and a computer readable recording medium.

According to an exemplary embodiment, there is provided an image processing apparatus including a memory, and a processor configured to obtain a High Dynamic Range (HDR) image by using a plurality of images having different brightness stored in the memory, and correct chromaticity for each pixel group including at least one pixel with respect to the obtained HDR image, wherein the processor is configured to identify an image to be used for chromaticity correction among the plurality of images for each pixel group and correct the chromaticity for each pixel group by using the identified image.

The processor may be further configured to identify an image with a minimum difference between brightness of each of areas of the plurality of images corresponding to the pixel group and brightness of the pixel group as an image to be used for chromaticity correction of the pixel group.

The processor may be further configured to, based on a difference between brightness of each of areas of the plurality of images corresponding to the pixel group and brightness of the pixel group being equal to or greater than a predetermined value, identify an image obtained by blending chromaticity of two top images having a small brightness difference among the plurality of images as an image used for chromaticity correction of the pixel group.

The processor may be further configured to correct chromaticity of at least one pixel constituting the pixel group on a pixel basis.

The processor may be further configured to calculate a blending ratio by using a difference between chromaticity of a pixel included in the pixel group and chromaticity of a pixel of the identified image corresponding to the pixel, and correct the chromaticity of the pixel group by blending the chromaticity of the pixel and the chromaticity of the pixel of the identified image at the calculated blending ratio.

The processor may be further configured to, based on a difference between chromaticity of a pixel included in the pixel group and chromaticity of a pixel of the identified image corresponding to the pixel being equal to or greater than a predetermined value, correct the chromaticity of the pixel group.

The processor may be further configured to obtain the difference between the chromaticity of the pixel included in the pixel group and the chromaticity of the pixel of the identified image corresponding to the pixel as a predetermined pixel spacing, correct chromaticity of a predetermined number of pixels which are adjacent to a pixel where the obtained chromaticity difference is equal to or greater than a predetermined value in the pixel group.

The processor may be further configured to reduce respective sizes of the pixel group and an area of the identified image corresponding to the pixel group, obtain a difference in chromaticity of pixels at positions corresponding to respective reduced areas, and correct chromaticity of an area of the pixel group corresponding to a pixel where the obtained chromaticity difference is equal to or greater than a predetermined value.

The processor may be further configured to, based on an original image being received, obtain a plurality of images having different brightness by using the original image, and store the plurality of obtained images in the memory.

The processor may be further configured to maintain brightness of the pixel group and correct chromaticity of the pixel group.

According to an exemplary embodiment, there is provided a method for image processing, the method including generating a High Dynamic Range (HDR) image by using a plurality of images having different brightness, determining an image to be used for chromaticity correction for each pixel group including at least one pixel with respect to the obtained HDR image, among the plurality of images, and correcting chromaticity of each pixel group by using the identified image.

The determining may include determining an image with a minimum difference between brightness of each of areas of the plurality of images corresponding to the pixel group and brightness of the pixel group as an image to be used for chromaticity correction of the pixel group.

The determining may include, based on a difference between brightness of each of areas of the plurality of images corresponding to the pixel group and brightness of the pixel group being equal to or greater than a predetermined value, using an image obtained by blending chromaticity of two top images having a small brightness difference among the plurality of images as an image to be used for chromaticity correction of the pixel group.

The correcting may include correcting chromaticity of at least one pixel constituting the pixel group on a pixel basis.

The correcting may include calculating a blending ratio based on a difference between chromaticity of a pixel included in the pixel group and chromaticity of a pixel of the identified image corresponding to the pixel, and correcting the chromaticity of the pixel group by blending the chromaticity of the pixel and the chromaticity of the pixel of the identified image at the obtained blending ratio.

The correcting may include, based on a difference between chromaticity of a pixel included in the pixel group and chromaticity of a pixel of the identified image corresponding to the pixel being equal to or greater than a predetermined value, correcting the chromaticity of the pixel group.

The correcting may include determining the difference between the chromaticity of the pixel included in the pixel group and the chromaticity of the pixel of the identified image corresponding to the pixel as a predetermined pixel spacing, and correcting chromaticity of a predetermined number pixels of pixels which are adjacent to a pixel where the obtained chromaticity difference is equal to or greater than a predetermined value in the pixel group.

The correcting may include reducing respective sizes of the pixel group and an area of the identified image corresponding to the pixel group, determining a difference in chromaticity of pixels at positions corresponding to respective reduced areas, and correcting chromaticity of an area of the pixel group corresponding to a pixel where the obtained chromaticity difference is equal to or greater than a predetermined value.

The correcting may include maintaining brightness of the pixel group and correcting chromaticity of the pixel group.

According to an exemplary embodiment, there is provided a computer readable recording medium having a program for executing an image processing method, wherein the image processing method includes generating a High Dynamic Range (HDR) image by using a plurality of images having different brightness, determining an image to be used for chromaticity correcting for each pixel group including at least one pixel with regard to the obtained HDR image among the plurality of images, and correcting chromaticity of each pixel group by using the identified image.

DETAILED DESCRIPTION OF EXEMPLARY EMBODIMENTS

The terms used in this specification will be briefly described, and the present disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The invention is not limited to an embodiment disclosed below and may be implemented in various forms and the scope of the invention is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments of the present disclosure will be described in detail with reference to the accompanying drawings so that those skilled in the art can easily carry out the present invention. However, the present disclosure may be embodied in many different forms and is not limited to the embodiments described herein. In order to clearly illustrate the present disclosure in the drawings, some of the elements that are not essential to the complete understanding of the disclosure are omitted for clarity, and like reference numerals refer to like elements throughout the specification.

Hereinafter, the present disclosure will be described in greater detailed with reference to drawings.

Figure 1:
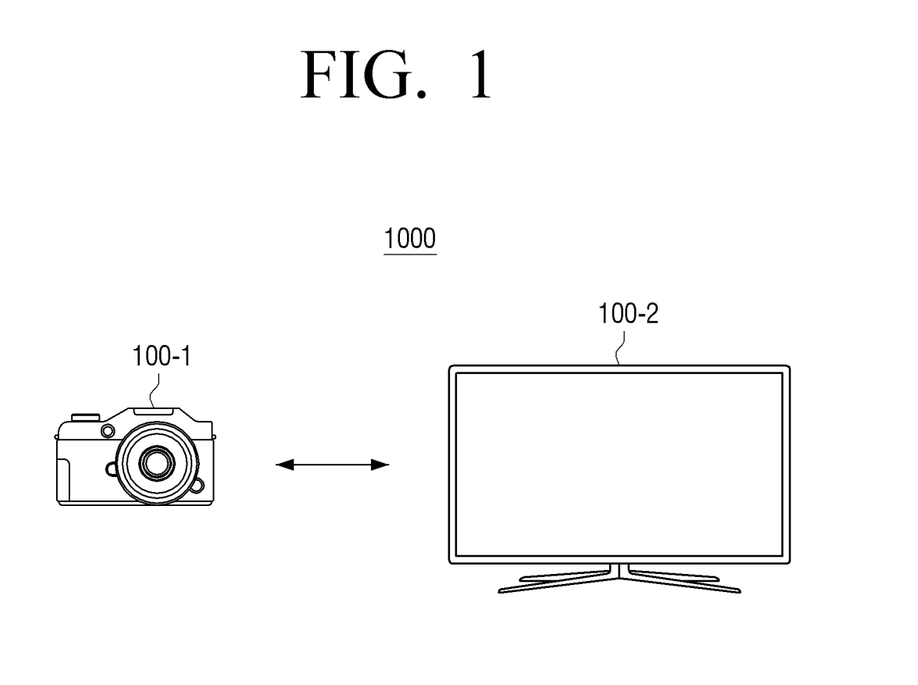
FIG. 1 is a view to explain an image processing system according to an embodiment of the present disclosure.

FIG. 1 is a view to explain an image processing system according to an embodiment of the present disclosure.

Referring to FIG. 1, an image processing system 1000 according to an embodiment of the present disclosure may include a first image processing apparatus 100-1 and a second image processing apparatus 100-2.

To be specific, the dynamic ranges of the first image processing apparatus 100-1 and the second image processing apparatus 100-2 may be different. The dynamic range refers to a contrast ratio between the brightest part and the darkest part of a digital image, and can be defined by Low Dynamic Range (LDR), Standard Dynamic Range (SDR), High Dynamic Range (HDR) depending on the level of the contrast ratio.

FIG. 1 illustrates the case where the image generated by the first image processing apparatus 100-1, which is a camera, is displayed on the second image processing apparatus 100-2. However, the present disclosure is not limited thereto, but both of the image processing apparatuses may be cameras, or display apparatuses, or may include a server capable of image processing. Alternatively, the image processing apparatus may include all types of devices capable of image processing, for example, a mobile device such as a PC, a smartphone, a set-top box, etc.

When the dynamic range of the first image processing apparatus 100-1 is narrower than that of the second image processing apparatus 100-2, an HDR image for displaying a Low Dynamic Range (LDR) image and a Standard Dynamic Range (SDR) image obtained by the first image processing apparatus 100-1 on the second image processing apparatus 100-2 having a wider dynamic range.

When the dynamic range of the first image processing apparatus 100-2 is wider than that of the second image processing apparatus 100-2, an HDR image may be obtained so that the detailed contrast of the image obtained by the first image processing apparatus 100-1 is displayed on the second image processing apparatus 100-2 having a narrow dynamic range.

The first image processing apparatus 100-1 may generate an HDR image and transmit the HDR image to the second image processing apparatus 100-2, or the second image processing apparatus 100-2 may receive an image from the first image processing apparatus 100-1 and generate an HDR image. Alternatively, although not shown, an additional external device such as a server may generate an HDR image by using the image received from the first image processing apparatus 100-1, and transmit the generated HDR image to the second image processing apparatus 100-2.

Figure 2:
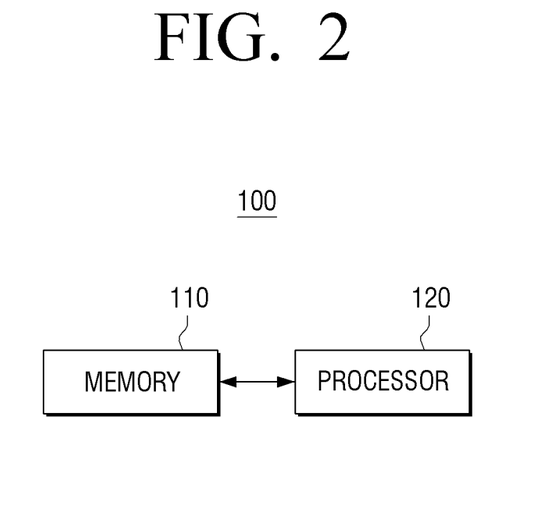
FIG. 2 is a block diagram to explain schematic configuration of an image processing apparatus according to an embodiment of the present disclosure.

FIG. 2 is a block diagram to explain schematic configuration of an image processing apparatus according to an embodiment of the present disclosure.

Referring to FIG. 2, an image processing apparatus 100 according to an embodiment of the present disclosure may include a memory 110 and a processor 120.

The memory 110 may store various programs and data necessary for the operation of the image processing apparatus 100. To be specific, the memory 110 may store a plurality of images having different brightness. The plurality of images may be consecutively captured or generated by using a single image.

The plurality of images may be consecutively captured by the image processing apparatus 100 or the external device. Alternatively, the plurality of images may be generated by using a single original image captured by the image processing apparatus 100 or the external device. The plurality of images may be generated by the image processing apparatus 100 that captures or receives an original image, or generated by the external device and transmitted to the image processing apparatus 100.

The processor 120 may generate an HDR image by using an original image, which is an LDR image or an SDR image. The processor 120 may generate an HDR image by using a single original image, or by synthesizing a plurality of images having different brightness, which are generated based on a single original image. Alternatively, the processor 120 may generate an HDR image by synthesizing a plurality of images having different brightness, which are consecutively captured. A method for generating an HDR image by using a signal image or multiple images may pertain to the related art, and therefore the detailed description thereof will be omitted.

The processor 120 may perform chromaticity correction on the generated HDR image. The processor 120 may perform chromaticity correction for each pixel group included in the generated HDR image. The pixel group may include at least one pixel. The chromaticity refers to color property except color brightness, which means color, saturation, color difference, etc. of a pixel. The processor 120 may divide the generated HDR image into a pixel group size, and perform image determination for chromaticity correction, and chromaticity correction for each divided area.

The processor 120 may control the shape of the pixel group and the number of pixels according to the characteristic of the image. The processor 120 may enable fine correction by making the size of the pixel group small by having a small number of pixels in the pixel group in the case of a high-frequency area having a large number of edges in the input image, and by making the size of the pixel group large by having a large number of pixels in the pixel group in the case of a low-frequency area having a small number of edges, thereby reducing the amount of calculation.

The processor 120 may select an image used for chromaticity correction for each pixel group of the generated HDR image. The processor 120 may select an image to be used for chromaticity correction for each pixel group, among a plurality of images having different brightness used for generating an HDR image.

The processor 120 may compare the brightness of an area corresponding to a pixel group, among a plurality of images, with the brightness of a pixel group, and select an image with a minimum difference between the brightness of the area corresponding to the pixel group and the brightness of the pixel group as an image used for chromaticity correction among the plurality of images. The area corresponding to a pixel group refers to an area corresponding to the position of the pixel group of the generated HDR image in each of the plurality of images. In addition, the minimum brightness difference means that the absolute value of the difference is at its minimum. This is because the brightness and the chromaticity are not independent in the color space, so that an image with the minimum brightness difference is selected as an image to be used for the chromaticity correction thereby minimizing the difference due to the color blur correction.

When the plurality of pixels are included in the pixel group, the processor 120 may compare averages of brightness of the plurality of pixels, or identify an image having the largest amount of pixels having the smallest brightness difference among the plurality of pixels in the pixel group, as an image to be used for chromaticity correction. A method for selecting an image used for chromaticity correction based on brightness may vary.

As described above, an image with the minimum brightness difference has been used as an image to be used for chromaticity correction, but in the implementation, various methods can be applied such as selecting an image with the largest chromaticity difference at the corresponding position as an image to be used for chromaticity correction.

When a difference between brightness of a pixel group of the generated HDR image and brightness of each of areas of a plurality of images corresponding to the pixel group is equal to or greater than a predetermined value, the processor 120 may identify an image obtained by blending a plurality of images as an image to be used for chromaticity correction on the pixel group. The term 'blending' refers to changing to a value between pixel values at the corresponding positions.

For example, if an HDR image is generated by using a high exposure image, a basic image and a low exposure image, and the brightness of the generated HDR pixel group is a value that is halfway between the brightness of respective areas in the high exposure image and the basic image corresponding to the pixel group, the processor 120 may determine an image obtained by blending the chromaticity of the high exposure image and the basic image, which are two top images with similar brightness, as an image to be used for chromaticity correction. The processor 120 may determine a blending ratio considering how similar the brightness of the pixel group and the brightness of the high exposure image and the basic image are.

When a difference between the chromaticity of a pixel included in the pixel group and the chromaticity of a pixel of the determined image corresponding to a pixel is equal to or greater than a predetermined value, the chromaticity correction on the pixel and the pixel group including the pixel may be performed. When the difference in chromaticity between the pixels is less than a predetermined value, the chromaticity correction on the pixel may not be performed.

The processor 120 may correct the chromaticity on at least one pixel constituting a pixel group on a pixel basis.

The processor 120 may determine the difference in chromaticity between all pixels included in the pixel group, and correct the chromaticity of the pixel based on the determined chromaticity difference. For example, the processor 120 may determine the difference in colors of the pixels included in the pixel group and the pixels included in the area corresponding to the determined image, and perform color and saturation correction on the pixel included in the pixel group based on the color difference.

The processor 120 may reduce the pixel group and the area of the determined area corresponding to the pixel group at a predetermined ratio, and determine the difference in chromaticity of the pixels corresponding to the respective reduced areas. The processor 120 may perform chromaticity correction only on the pixel included in the area corresponding to a pixel where the difference in chromaticity determined in the reduced area is equal to or greater than the predetermined value in the pixel group before reduction. The detailed description thereof will be made with reference to FIG. 5.

The processor 120 may determine the difference between the chromaticity of the pixel included in the pixel group and the chromaticity of the pixel of the determined image corresponding to the pixel as a predetermined pixel spacing, and perform chromaticity correction only on the pixel where the determined chromaticity difference is equal to or greater than a predetermined value and the pixel adjacent thereto. The detailed description thereof will be made with reference to FIG. 6.

As described above, it is possible to reduce the resources used for the operation by correcting the chromaticity difference only for some pixels without correcting the chromaticity differences for all the pixels included in the pixel group.

The processor 120 may correct the chromaticity of the pixel included in the pixel group by using a blending ratio calculated by using the difference between the chromaticity of the pixel included in the pixel group and the chromaticity of the pixel of the determined image corresponding to the pixel.

The processor 120 may calculate a blending ratio by using the difference between the chromaticity of the pixel included in the pixel group and the chromaticity of the pixel of the determined image corresponding to the pixel as the following Equation (1).

$$\alpha_{i,j} = K \cdot abs(H_{i,j}^{Fs} - H_{i,j}^{Ref})$$

$$\beta_{i,j} = T \cdot abs(H_{i,j}^{Fs} - H_{i,j}^{Ref}) \qquad \text{Equation (1)}$$

Where $\alpha$ is a blending ratio for color correction, $\beta$ is a blending ratio for saturation correction, i and j are positions of pixels, $H^{Fs}$ is a color value of a pixel of a pixel group, $H^{Ref}$ is a color value of a pixel of a determined image, and K and T are arbitrary setting values stored in the memory 110. $\alpha$ and $\beta$ range between 0 and 1.

The processor 120 may correct the chromaticity (color and saturation) of the pixel as the following Equation (2) by using a blending ratio calculated based on Equation (1).

$$H_{i,j}^{Result} = \alpha \cdot H_{i,j}^{Ref} + (1-\alpha) \cdot H_{i,j}^{Fs}$$

$$S_{i,j}^{Result} = \beta \cdot S_{i,j}^{Ref} + (1-\beta) \cdot S_{i,j}^{Fs}$$

$$V_{i,j}^{Result} = V_{i,j}^{Fs} \qquad \text{Equation (2)}$$

Where $S^{Fs}$ is a saturation value of a pixel of a pixel group, $S^{Ref}$ is a saturation value of a pixel of a determined image, $V^{Fs}$ is a brightness value of a pixel of a pixel group, and $V^{Ref}$ is a brightness value of a pixel of a determined image.

Referring to equation 2, as the difference between the chromaticity of the pixel included in the pixel group and the chromaticity of the pixel of the determined image corresponding to the pixel increases, a ratio between the color and the saturation of the determined image may increase.

The processor 120 may correct the chromaticity of the pixel group while maintaining the brightness of the pixel included in the pixel group as above equation (2).

In the above description, pixel values have been described based on the HSV color space. In the implementation, the present disclosure can be applied to values based on the Lab color space and the YCbCr color space. If the brightness values are not separated as in the RGB color space, the present disclosure can be applied by converting into color spaces such as HSV, Lab, and YCbCr color spaces which the brightness values are separated.

According to various embodiments of the present disclosure, when an HDR image is generated by widely increasing a dynamic range, it is possible to obtain a rich color image while suppressing the color blurring.

Figure 3:
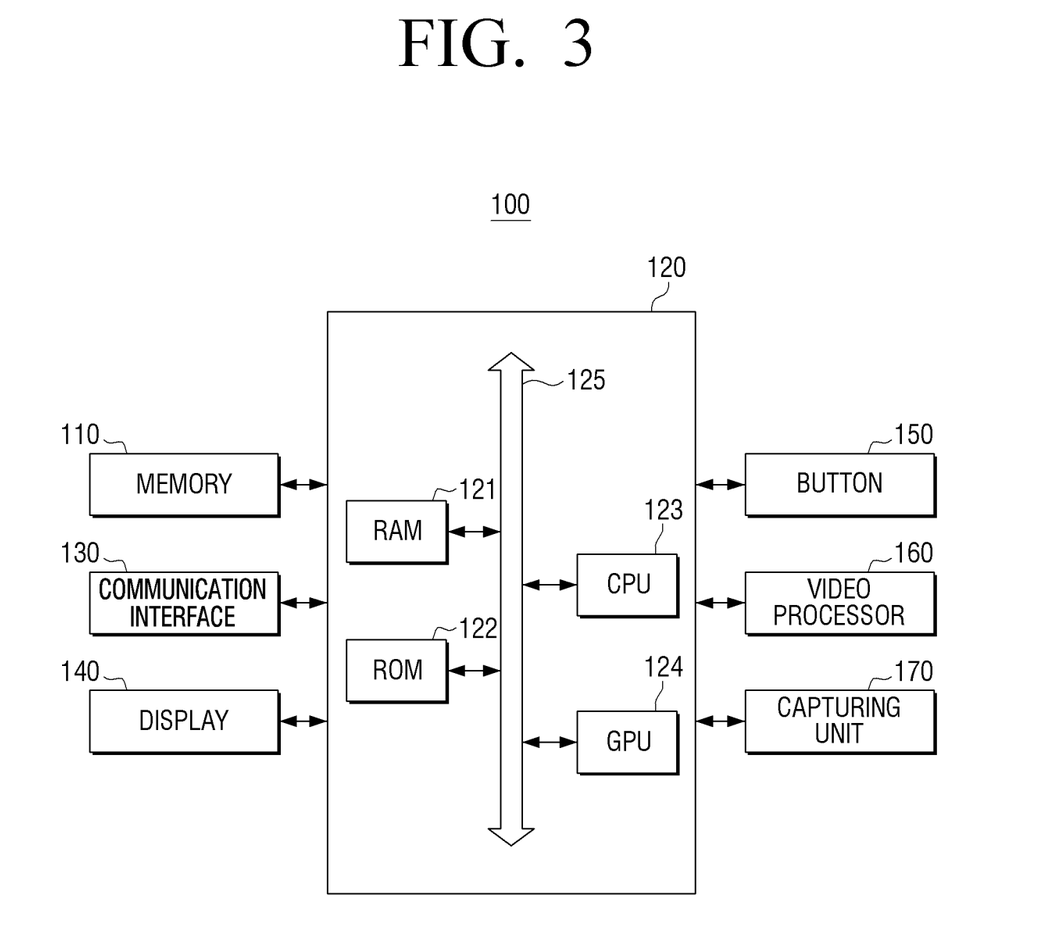
FIG. 3 is a block diagram to explain detailed configuration of an image processing apparatus according to an embodiment of the present disclosure.

FIG. 3 is a block diagram to explain detailed configuration of an image processing apparatus according to an embodiment of the present disclosure.

Referring to FIG. 3, an image processing apparatus 100 may include a memory 110, a processor 120, a communication interface 130, a display 140, a button 150, a video processor 160 and a capturing unit 170. The memory 110 and the processor 120 are the same as the configurations shown in FIG. 2. Thus, the redundant description will be omitted.

The processor 120 may include a RAM 121, a ROM 122, a CPU 123, a Graphic Processing Unit (GPU) 124, and a bus 125. The RAM 121, the ROM 122, the CPU 123, the Graphic Processing Unit (GPU) 124, and the like may be connected to one another via the bus 125.

The CPU 123 may access the memory 110 and perform booting by using an operating system (O/S) stored in the memory 110. The CPU 123 may perform various operations by using various programs, contents, data, etc. stored in the memory 110.

A command set, etc. for system botting may be stored in the ROM 122. When a turn-on command is input and power is supplied, the CPU 123 may copy the O/S stored in the memory 110 to the RAM 121 according to the command stored in the ROM 122, execute the O/S and perform system booting. When the system booting is completed, the CPU 123 may copy the various programs stored in the memory 110 to the RAM 121, execute the program copied to the RAM 121 and perform various operations.

When the booting of the image processing apparatus 100 is completed, the GPU 124 may display a UI on the display 140. To be specific, the GPU 124 may generate a screen including various objects such as icons, images, texts, etc. by using a calculation unit (not shown) and a rendering unit (not shown). The calculation unit may calculate attribute values such as coordinate values, shapes, sizes, colors, etc. of the objects according to the layout of the screen. The rendering unit may generate screens of various layouts including objects based on the attribute values calculated by the calculation unit. The screen (or a user interface window) generated by the rendering unit may be provided to the display 140 and displayed in a main display area and a sub-display area.

The communication interface 130 may be configured to perform communication with various types of external devices according to various types of communication methods. The communication interface 130 may receive an LDR image or an SDR image from an external device, and transmit the HDR image generated or corrected by the processor 120 to an external device such as an additional display apparatus. The communication interface 130 may receive a plurality of images having different brightness from the external device.

The communication interface 130 may receive an image in a wired manner using, for example, an antenna, a cable, or a port, or in a wireless manner via, for example, Wi-Fi, Bluetooth, etc. In the implementation, the image processing apparatus 100 may receive an image selected by a user among a plurality of images stored in the memory 110 provided in the image processing apparatus 100 and process the image.

When the image processor apparatus 100 performs communication in a wireless manner, the communication interface 130 may include a Wi-Fi chip, a Bluetooth chip, a wireless communication chip, and an NFC chip. To be specific, the Wi-Fi chip and the Bluetooth chip may perform communication using the WiFi method and the Bluetooth method, respectively. When the Wi-Fi chip or the Bluetooth chip is used, various connectivity information such as an SSID and a session key may be transceived, communication connection may be established based on the connectivity information, and various information may be transceived. The communication chip may refer to a chip that performs communication according to various communication standards such as IEEE, ZigBee, 3rd Generation (3G), 3rd Generation Partnership Project (3GPP), Long Term Evolution (LTE), etc. The NFC chip may refer to a chip operating in a Near Field Communication (NFC) method that uses 13.56 MHz frequency band among various RF-ID frequency bands such as 135 kHz, 13.56 MHz, 433 MHz, 860 to 960 MHz, 2.45 GHz, etc.

The display 140 may display an HDR image generated or corrected by the processor 120. The display 140 may be embodied with various types of display such as a liquid crystal display (LCD), an organic light emitting diode (OLED) or a plasma display panel (PDP) or the like. The display 140 may include a driving circuit embodied in the form of a-si TFT, low temperature poly silicon (LTPS) TFT, organic TFT (OTFT), etc., a backlight unit, etc. The display 140 may be embodied as a flexible display.

It has been described that a display function and a gesture detection function are performed in the same configuration, but could be performed in different configurations. In addition, according to various embodiments, the display 140 may not be provided in the image processing apparatus 100.

The button 150 may be various types of buttons such as a machine button, a touch pad, a wheel, etc. formed in an arbitrary area such as a front surface part, a side surface part, and a rear surface part, etc. of the main body of the image processing apparatus 100.

The video processor 160 may be configured to process contents received through the communication interface 130, or video data included in the contents stored in the memory 110. The video processor 160 may perform various image processing such as decoding, scaling, noise filtering, frame rate conversion, resolution conversion, etc. of video data.

The capturing unit 170 may be configured to capture a stop image or a video under the control of a user. The capturing unit 170 may capture at least one image for generating an HDR image.

The capturing unit 170 may include a lens, an image sensor, etc. In addition, the capturing unit 170 may include a plurality of cameras such as a front surface camera, a rear surface camera, etc. According to various embodiments of the present disclosure, the capturing unit 170 may not be provided in the image processing apparatus 100.

Although not shown in FIG. 3, according to an embodiment, various external input ports for connecting with various external terminals such as a USB port through which a USB connector can be connected in the image processing apparatus 100, a headset, a mouse, LAN, etc., a DMB chip for receiving and processing a Digital Multimedia Broadcasting (DMB) signal, and various sensors may be further included.

Figure 4:
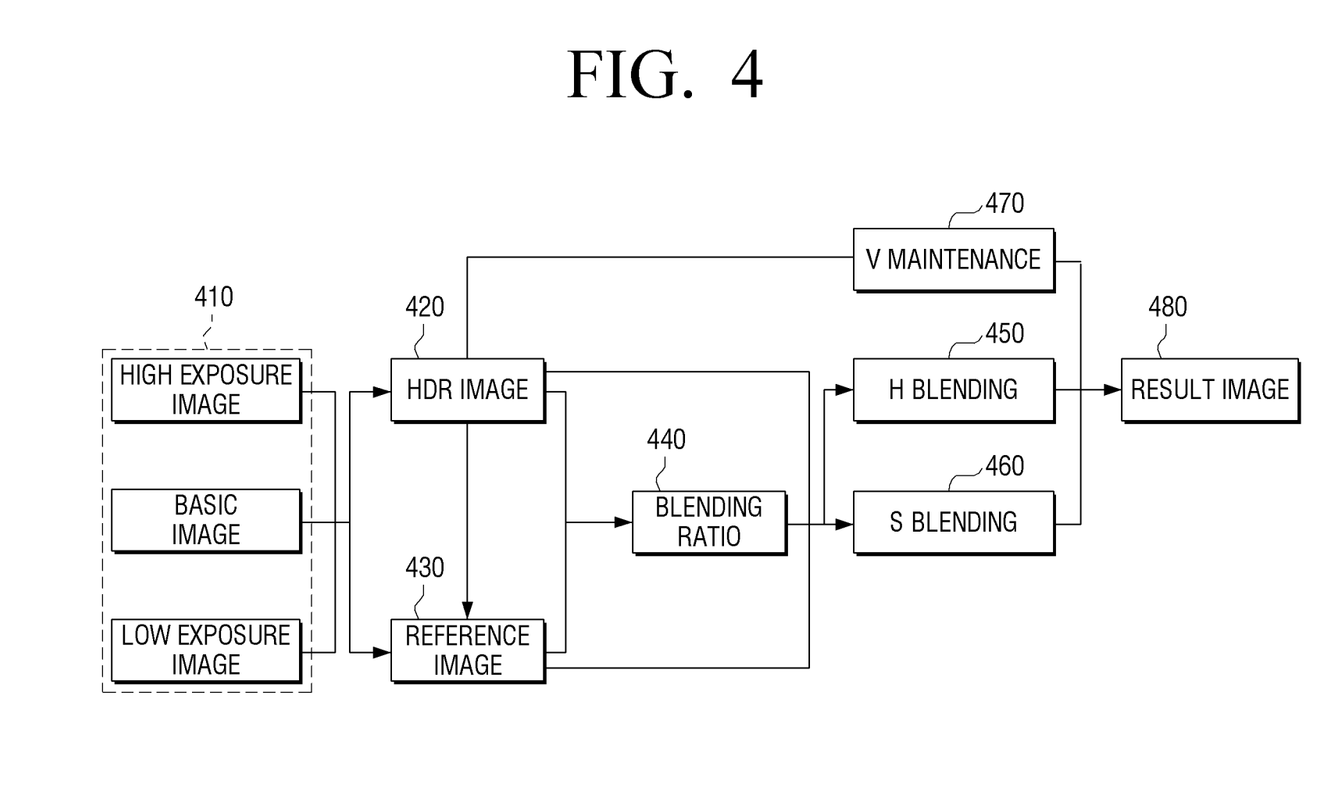
FIG. 4 is a block diagram to explain an image processing process according to an embodiment of the present disclosure.

FIG. 4 is a block diagram to explain an image processing process according to an embodiment of the present disclosure.

Referring to FIG. 4, an image processing apparatus may generate an HDR image 420 by using a plurality of images 410 having different brightness. The plurality of images 410 may include a high exposure image, a basic image and a low exposure image. FIG. 4 illustrates that the HDR image 420 is generated by using the plurality of images 410, but in the implementation, an HDR image may be generated by using a single image, and any type of HDR image generation method could be applied.

The image processing apparatus may select one of the plurality of images 410 as a reference image 430. The reference image 430 refers to an image to be used for correcting the chromaticity of the generated HDR image 420.

To be specific, the image processing apparatus may select an image with the smallest brightness difference between the brightness of a pixel group, which is the part of the HDR image 420, and the brightness of an area corresponding to the pixel group as the reference image 430. When the difference between the brightness of the pixel group, which is the part of the HDR image 420, and the brightness of each area corresponding to the pixel group is equal to or greater than a predetermined value, the processor 120 may determine two top images with the least brightness difference as the reference image 430.

The image processing apparatus may calculate a blending ratio 440 based on the difference between the chromaticity of the area of the reference image 430 corresponding to the pixel group and the chromaticity of the pixel group of the HDR image 420.

The image processing apparatus may generate a result image 480 obtained by correcting the chromaticity based on H (color) blending 450 and S (saturation) blending 460 by using the calculated blending ratio 440. The image processing apparatus may generate the result image 480 obtained by correcting the chromaticity by blending the color and the saturation of the HDR image 420 and the reference image 430 according to the calculated blending ratio 440. The calculation operation of the blending ratio 440 and the chromaticity correction operation have been described in detail with respect to FIG. 2, and the redundant description will be omitted.

The image processing apparatus may maintain 470 the brightness (V) in the process of generating the image result image 480 through the chromaticity correction. In other words, the image processing apparatus may maintain the brightness of the generated HDR image 420.

In the above description, the pixel values are described based on the HSV color space. In the implementation, the present disclosure can be applied to values based on the Lab color space and the YCbCr color space. Specifically, when the Lab color space is used, the image processing apparatus may perform correction by blending the values a and b while maintaining the L value. When the YCbCr color space is used, the image processing apparatus may perform correction by blending Cb and Cr values while maintaining the Y value.

If the brightness values are not separated as in the RGB color space, the technique of the present disclosure can be applied by converting into the HSV, Lab, and YCbCr color spaces where the brightness values are separable.

Figure 5:
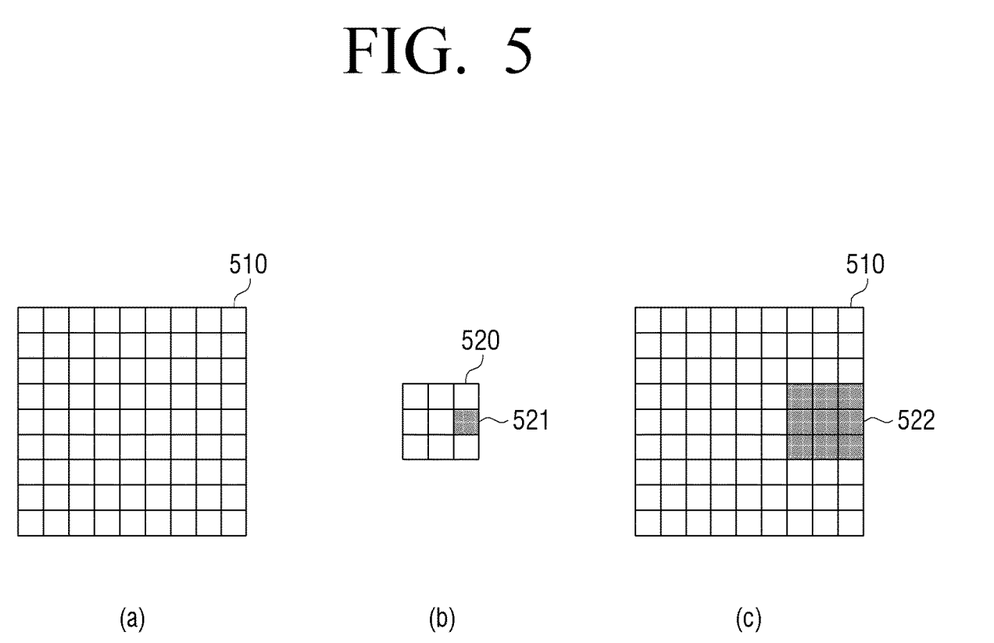
FIG. 5 is a view to explain an operation for determining an area to perform a chromaticity correction according to an embodiment of the present disclosure.

FIG. 5 is a view to explain an operation for determining an area to perform a chromaticity correction according to an embodiment of the present disclosure. FIG. 5 illustrates an example in which the amount of calculation is reduced by determining a pixel for performing chromaticity correction by reducing the size of a pixel group.

Referring to FIG. 5A, a pixel group 510 of the generated HDR image may be in the form of 9×9. However, the present disclosure is not limited to an example embodiment, and the pixel group may be in the form of a polygon, not a square.

The image processing apparatus may generate a pixel group 520 reduced to a 3×3 form by reducing the pixel group 510 of the HDR image at a ratio of 1/3 as shown in FIG. 5B. Although not shown, the image processing apparatus may reduce an area corresponding to the pixel group 510 at a ratio of 1/3 in the reference image determined as an image to be used for the chromaticity correction on the pixel group 510. However, in the implementation, the form, size, reduction ratio, etc. of the pixel group are limited to FIG. 5, but vary depending on the case.

The image processing apparatus may determine the chromaticity difference between the reduced pixel group 520 and the pixel corresponding to the reduced area of the reference image. For example, as shown in FIG. 5B, when the chromaticity difference of a pixel 521 at a position (2, 3) of the reduced pixel group 520 is equal to or greater than a predetermined value, the image processing apparatus, as shown in FIG. 5C, may perform chromaticity correction on the pixel included in an area 522 corresponding to the pixel 521 at the position (2, 3) of the reduced pixel group 520 in the pixel group 510.

By not determining whether the chromaticity correction is performed on all pixels include in the pixel group, the resources used for correcting an HDR image may be reduced.

Figure 6:
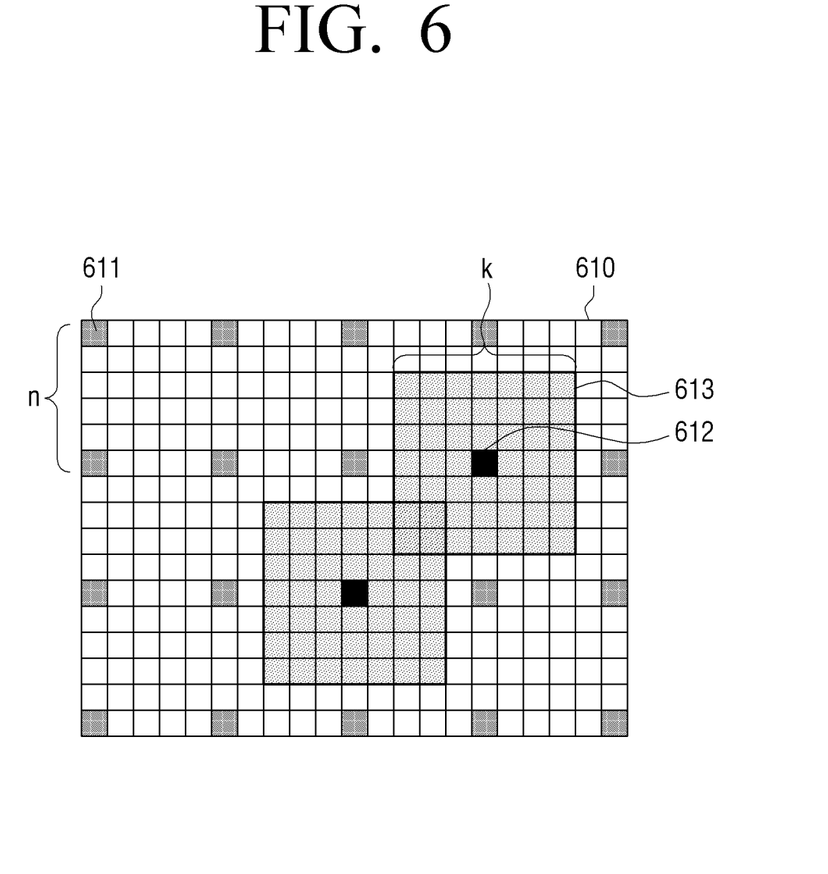
FIG. 6 is a view to explain an operation of determining an area to perform a color correction according to another embodiment of the present disclosure.

FIG. 6 is a view to explain an operation of determining an area to perform a color correction according to another embodiment of the present disclosure. FIG. 6 illustrates an example in which the amount of calculation used for chromaticity correction is reduced by determining the chromaticity difference of the pixel included in the pixel group by a predetermined pixel spacing.

Referring to FIG. 6, an image processing apparatus may generate a pixel group 610 of the generated HDR image to a 21×16 form. However, the present disclosure is not limited to an example embodiment, and the pixel group may be in the form of a polygon, not a square.

The image processing apparatus may calculate the chromaticity difference between a reference image and a pixel 611 at a predetermined spacing n, among a plurality of pixels included in the pixel group 610 of the HDR image. Referring to FIG. 6, the predetermined spacing may include 5 (five) pixels in a row direction, and 5 (five) pixels in a column direction, but is not limited thereto in the implementation.

When there is a pixel 612 where the difference in chromaticity from the reference image is equal to or greater than a predetermined value, among the pixels 611 with a predetermined spacing, the image processing apparatus may perform chromaticity correction on the pixel 612 where the chromaticity difference is equal to or greater than a predetermined value, and a predetermined number of adjacent pixels 613. The image processing apparatus may calculate the chromaticity difference by pixel with respect to a predetermined number k of adjacent pixel 613 and correct the chromaticity based on the calculated chromaticity difference. Referring to FIG. 5, the predetermined number of adjacent pixels may be 48 in a 7×7 area, which is including the pixel 612 of which chromaticity difference is equal to or greater than a predetermined value at its center, but in the implementation, the size and shape of the adjacent area are not limited thereto.

The resources used for correcting an HDR image may be reduced by not determining whether the chromaticity correction is not performed on all pixels included in the pixel group.

Figure 7:
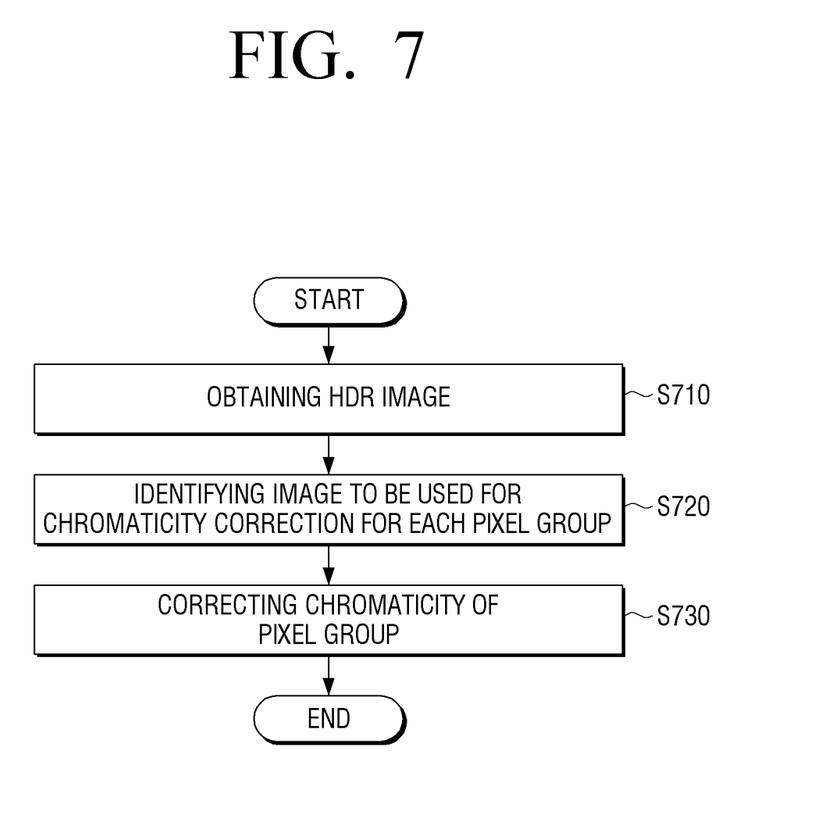
FIG. 7 is a flowchart to explain an image processing method according to an embodiment of the present disclosure.

FIG. 7 is a flowchart to explain an image processing method according to an embodiment of the present disclosure.

Referring to FIG. 7, an image processing apparatus may generate an HDR image at step S710. The image processing apparatus may generate an HDR image by using a single image or multiple images. Any type of the HDR image generating method in the related art could be applied The image processing apparatus may determine an image to be used for the chromaticity correction by pixel group at step S720. The image used for chromaticity correction may be referred to as a reference image.

The image processing image may determine a reference image for each pixel group of the generated HDR image among a plurality of images having different brightness. The plurality of images may be multiple images used for generating an HDR image, or may be generated by controlling the brightness of a single image used for generating the HDR image.

The image processing apparatus may determine an image with the smallest bright difference from the pixel group among the plurality of images as a reference image, and when the difference in brightness is equal to or greater than a predetermined value, an image obtained by blending the two top images having a small brightness difference as a reference image.

The image processing apparatus may correct the chromaticity on the pixel group at step S730. The image processing apparatus may correct the chromaticity on the pixel group by using a reference image determined for each pixel group of the HDR image. The image processing apparatus may calculate a blending ratio by using the difference between the chromaticity of the area of the reference image corresponding to the pixel group of the HDR image and the chromaticity of the pixel group of the HDR image. In addition, the image processing apparatus may correct the chromaticity of the pixel group by using the calculated blending ratio.

The image processing apparatus may calculate the chromaticity difference for chromaticity correction with respect to all pixels included in the pixel group, or as shown in FIGS. 5 and 6, the image processing apparatus may perform an operation for calculating the difference in chromaticity for the chromaticity correction with respect to a partial area.

According to various embodiments of the present disclosure, it is possible to obtain a rich color image while suppressing color burring when generating an HDR image by widely increasing a dynamic range.

The various embodiments described above may also be embodied in a recording medium readable by a computer or a similar device using software, hardware, or a combination thereof. In accordance with a hardware implementation, the embodiments described in the present disclosure may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions. In some cases, embodiments described herein may be implemented by the processor 120 itself. In the implementation by hardware, embodiments such as the procedures and functions described herein may be implemented in separate software modules. Each of the software modules may perform one or more of the functions and operations described herein.

Meanwhile, an image processing method according to various embodiments of the present disclosure could be stored in a non-transitory readable medium. Such non-transitory readable medium could be used in various devices.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. An image processing apparatus, comprising:
a memory; and
a processor configured to:
 obtain a High Dynamic Range (HDR) image based on a plurality of images having different brightness stored in the memory,
 identify, for each of a plurality of pixel groups included in the obtained HDR image, an image for correcting chromaticity for the plurality of pixel groups from among the plurality of images, respectively, and
 correct the chromaticity for each of the plurality of pixel groups included in the obtained HDR image based on the identified image.

2. The image processing apparatus as claimed in claim 1, wherein the processor is further configured to identify an image with a minimum difference between brightness of each of areas of the plurality of images corresponding to the plurality of pixel groups and brightness of the plurality of pixel groups as an image to be used for chromaticity correction of the plurality of pixel groups.

3. The image processing apparatus as claimed in claim 1, wherein the processor is further configured to, based on a difference between brightness of each of areas of the plurality of images corresponding to the plurality of pixel groups and brightness of the plurality of pixel groups being equal to or greater than a predetermined value, identify an image obtained by blending chromaticity of two top images having a small brightness difference among the plurality of images as an image used for chromaticity correction of the plurality of pixel groups.

4. The image processing apparatus as claimed in claim 1, wherein the processor is further configured to correct chromaticity of at least one pixel constituting the plurality of pixel groups on a pixel basis.

5. The image processing apparatus as claimed in claim 1, wherein the processor is further configured to:
obtain a blending ratio by using a difference between chromaticity of a pixel included in the plurality of pixel groups and chromaticity of a pixel of the identified image corresponding to the pixel, and
correct the chromaticity of the plurality of pixel groups by blending the chromaticity of the pixel and the chromaticity of the pixel of the identified image at the obtained blending ratio.

6. The image processing apparatus as claimed in claim 1, wherein the processor is further configured to, based on a difference between chromaticity of a pixel included in the plurality of pixel groups and chromaticity of a pixel of the identified image corresponding to the pixel being equal to or greater than a predetermined value, correct the chromaticity of the plurality of pixel groups.

7. The image processing apparatus as claimed in claim 6, wherein the processor is further configured to:
obtain the difference between the chromaticity of the pixel included in the plurality of pixel groups and the chromaticity of the pixel of the identified image corresponding to the pixel as a predetermined pixel spacing, and
correct chromaticity of a predetermined number of pixels which are adjacent to a pixel where the obtained chromaticity difference is equal to or greater than a predetermined value in the plurality of pixel groups.

8. The image processing apparatus as claimed in claim 6, wherein the processor is further configured to:
reduce respective sizes of the plurality of pixel groups and an area of the identified image corresponding to the plurality of pixel groups,
obtain a difference in chromaticity of pixels at positions corresponding to respective reduced areas, and
correct chromaticity of an area of the plurality of pixel groups corresponding to a pixel where the obtained chromaticity difference is equal to or greater than a predetermined value.

9. The image processing apparatus as claimed in claim 1, wherein, based on an original image being received, the processor is further configured to:
obtain a plurality of images having different brightness by using the original image, and
store the plurality of obtained images in the memory.

10. The image processing apparatus as claimed in claim 1, wherein the processor is further configured to maintain brightness of the plurality of pixel groups and correct chromaticity of the plurality of pixel groups.

11. A method for image processing, the method comprising:
obtaining a High Dynamic Range (HDR) image based on a plurality of images having different brightness;
identifying, for each of a plurality of pixel groups included in the obtained HDR image, an image for correcting chromaticity for the plurality of pixel groups from among the plurality of images, respectively; and
correcting the chromaticity for each of the plurality of pixel groups included in the obtained HDR image based on the identified image.

12. The method as claimed in claim 11, wherein the identifying of the image comprises identifying an image with a minimum difference between brightness of each of areas of the plurality of images corresponding to the plurality of pixel groups and brightness of the plurality of pixel groups as an image to be used for chromaticity correction of the plurality of pixel groups.

13. The method as claimed in claim 11, wherein the identifying of the image comprises, based on a difference between brightness of each of areas of the plurality of images corresponding to the plurality of pixel groups and brightness of the plurality of pixel groups being equal to or greater than a predetermined value, using an image obtained by blending chromaticity of two top images having a small brightness difference among the plurality of images as an image to be used for chromaticity correction of the plurality of pixel groups.

14. The method as claimed in claim 11, wherein the correcting of the chromaticity comprises correcting chromaticity of at least one pixel constituting the plurality of pixel groups on a pixel basis.

15. The method as claimed in claim 11, wherein the correcting of the chromaticity comprises:
obtaining a blending ratio based on a difference between chromaticity of a pixel included in the plurality of pixel groups and chromaticity of a pixel of the identified image corresponding to the pixel, and
correcting the chromaticity of the plurality of pixel groups by blending the chromaticity of the pixel and the chromaticity of the pixel of the identified image at the obtained blending ratio.

16. The method as claimed in claim 11, wherein the correcting of the chromaticity comprises, based on a difference between chromaticity of a pixel included in the plurality of pixel groups and chromaticity of a pixel of the identified image corresponding to the pixel being equal to or greater than a predetermined value, correcting the chromaticity of the plurality of pixel groups.

17. The method as claimed in claim 16, wherein the correcting of the chromaticity comprises:
obtaining the difference between the chromaticity of the pixel included in the plurality of pixel groups and the chromaticity of the pixel of the identified image corresponding to the pixel as a predetermined pixel spacing, and
correcting chromaticity of a predetermined number pixels of pixels which are adjacent to a pixel where the obtained chromaticity difference is equal to or greater than a predetermined value in the plurality of pixel groups.

18. The method as claimed in claim 16, wherein the correcting of the chromaticity comprises:
reducing respective sizes of the plurality of pixel groups and an area of the identified image corresponding to the plurality of pixel groups,
obtaining a difference in chromaticity of pixels at positions corresponding to respective reduced areas, and
correcting chromaticity of an area of the plurality of pixel groups corresponding to a pixel where the obtained chromaticity difference is equal to or greater than a predetermined value.

19. The method as claimed in claim 11, wherein the correcting of the chromaticity comprises maintaining brightness of the plurality of pixel groups and correcting chromaticity of the plurality of pixel groups.

20. A non-transitory computer readable recording medium having a program for executing an image processing method, wherein the image processing method comprises:
obtaining a High Dynamic Range (HDR) image based on a plurality of images having different brightness;
identifying, for each of a plurality of pixel groups included in the obtained HDR image, an image for correcting chromaticity for the plurality of pixel groups from among the plurality of images, respectively; and
correcting the chromaticity for each of the plurality of pixel groups included in the obtained HDR image based on the identified image.

* * * * *